United States Patent [19]
Stefl et al.

[11] Patent Number: 5,724,798
[45] Date of Patent: Mar. 10, 1998

[54] LATCH FOR A FOLDING CORN HEAD

[75] Inventors: Joel C. Stefl; Edwin J. Zeitvogel, both of Byron, N.Y.

[73] Assignee: Byron Enterprises Inc., Byron, N.Y.

[21] Appl. No.: 680,503

[22] Filed: Jul. 8, 1996

[51] Int. Cl.$^6$ .................................................. A01D 45/02
[52] U.S. Cl. .............................. 56/119; 56/228; 172/311; 292/332
[58] Field of Search ........................ 56/119, 218, 228, 56/396, 384, 380, 51, 94, 95, 97, 83, 84, 85, 73, 6; 172/481, 452, 459, 506, 311, 132; 292/332, DIG. 12

[56] References Cited

U.S. PATENT DOCUMENTS

| | | | |
|---|---|---|---|
| 600,584 | 3/1898 | Kaye | 292/332 |
| 1,476,254 | 12/1923 | Jacobsky | 292/332 |
| 2,610,880 | 9/1952 | Gayner et al. | 292/232 |
| 3,944,001 | 3/1976 | Warner et al. | 172/311 |
| 4,557,335 | 12/1985 | Handy | 172/311 X |
| 4,660,654 | 4/1987 | Wiebe et al. | 172/311 X |
| 5,329,753 | 7/1994 | Arnold et al. | 56/288 X |
| 5,353,580 | 10/1994 | Wolff | 56/6 X |

FOREIGN PATENT DOCUMENTS 801779  2/1981  U.S.S.R. ......................... 56/228

*Primary Examiner*—Randolph A. Reese
*Assistant Examiner*—Heather Shackelford
*Attorney, Agent, or Firm*—M. Lukacher

[57] ABSTRACT

A latch (48) for securing a pivotable portion (34) of a foldable corn head (10) to a fixed portion (32) thereof, the latch being actuated to close or open by the folding action of the corn head portions. In closing the latch, a slidable pin actuator (50) on one of the frame portions, which extends beyond the frame is engaged by the other frame portion. The motion of the pin rotates a crank (56) connected by a connecting link (64 to a rotatable overcenter catch (62) extending through a slot (69) in the other frame portion. The crank rotation causes the catch to rotate to engage and secure the other frame portion on its rear surface (70). Opening of the latch is the reverse of closing. Preferably, the lengths of the crank arms (58 & 60), connecting link, catch shaft (67), and the angles therebetween are selected such that the motion of the catch mimics in synchrony the motion of the pin.

7 Claims, 7 Drawing Sheets

LATCH FOR A FOLDING CORN HEAD

This is a continuation-in-part of a pending application filed in the name of Joel C. Stefl, et al, Ser. No. 08/582,687.

The present invention relates to mechanisms for latching hinged elements, more particularly to self-actuated hinge latches wherein the hinging action of the elements opens and closes the latch, and most particularly to a self-actuated hinge latch for securing in operating position the foldable portion of a foldable corn head of a corn harvesting machine.

The parent application is directed to a corn harvesting machine having a multiple-row harvesting head, the outer portions of which can be pivoted (or "folded") out of operating position to provide an overall width of the machine sufficiently narrow to permit travel from field to field over narrow roads, such as are common in Europe.

Corn harvesting heads are well known. Typically, harvesting apparatus is disposed on the front of a self-propelled tractor having a central, longitudinal conveyance system which carries harvested ears from the corn head to a receiving vessel or vehicle. Each row has a harvesting channel which typically comprises a pair of row separators which straddle a row of growing corn in the field and a pair of driven gathering belts and cutters which strip ears from the stalks, discard the stalks, and convey the ears rearward to the tractor conveyor.

Commercially available corn heads are capable of harvesting a plurality of rows, up to eight or more, simultaneously by ganging side-by-side replicate row harvesting channels. Such machines are necessarily quite wide, up to five meters or more. A serious drawback is that their width makes road travel between cornfields difficult or impossible. In some areas, especially in Europe, such wide machines are not permitted on the roads. Accordingly, mechanisms have been devised by some corn head manufacturers to permit narrowing of their corn heads for over-the-road travel by pivoting upward and inward one or more of the outer harvesting sections so that in travel mode the corn head is no wider than the tractor bearing it. For example, foldable corn heads are available from Fantini Bouchard Agriculture, Saint-Brice, France; F.lli CRESSONI s.p.a., Mantova, Italy; CASE IH, Division Agricole de Case Poclain S.A., Le Plessis-Beleville Cedex, France; and Pixall Corp., Clear Lake, Wis.

Folding the harvesting mechanism requires that an outer portion of the mechanism on one or both sides of the harvester be pivotably separable on a hinge from the fixed machine frame for transport and be subsequently reattachable in driving/driven relationship for use. Typically, a hydraulic actuator operable across the hinge is retracted to lift the pivotable portion into travel position and is extended to return the pivotable portion to operating position.

Although the pivotable portion may be held substantially in operating position by the hydraulic actuator in a plane including the actuator, it is desirable to provide an auxiliary positive mechanical latch remote from the plane of actuation to resist torsional stresses on the hinge during field operation of the harvester. In operating position, the pivotable portion of known foldable harvesters typically is secured to the fixed portion by any of several known latching mechanisms, for example, a hand-actuated bolt or a hydraulic bolt or an electrically-actuated solenoid slug, as in item 68 in the parent application.

Hand-actuated latches are undesirable because they require the operator to stop and dismount from the harvester to manually latch or unlatch the mechanism. This can be hazardous, particularly as the pivotable portions may be actuated by powerful hydraulic cylinders. Hydraulically- or electrically-actuated bolts may be operated remotely, but such apparatus can be expensive to provide and is vulnerable to power failure. Thus a need exists for a simple mechanical latching mechanism which can provide a positive latch, which requires no electrical or hydraulic source of power, and which is actuated by the movement of the hinged elements themselves.

It is a principal object of the invention to provide an improved latch for securing the pivotable portion of a foldable corn head to the fixed portion.

It is a further object of the invention to provide an improved latch for a foldable corn head wherein the latch is opened or closed by the folding action of the corn head.

It is a still further object of the invention to provide an improved latch for a foldable corn head wherein the latching portion of the latch is remote from the actuating mechanism thereof, being mechanically connected thereto.

Briefly described, a foldable multiple-row corn head embodying the invention has a plurality of side-by-side row harvesters which can include separators, cutters, gathering belts and other harvesting elements well known in the trade. At least one end of the corn head, preferably both ends, has a frame portion supporting a portion of the row harvesters and being pivotable with respect to the fixed frame on a hinge having a substantially horizontal axis oriented substantially fore-and-aft of the machine in response to an hydraulic cylinder connected pivotably between the corn head fixed frame and a linkage attached to the pivotable frame. Preferably, the pivotable portion can be rotated through approximately 180° to place it either in upright (operating) position adjacent to the next inboard (first fixed) row harvester or alternatively in inverted (travel) position above the next inboard row harvester.

Either the fixed portion or the pivotable portion is provided with latching apparatus in accordance with the invention to latch securely the pivotable portion to the fixed portion in operating position. Preferably, the pivotable portion is provided with a slidable captive pin which extends at rest beyond the inner edge of the pivotable frame, which pin is engaged and driven axially by the fixed frame during closing of the hinge through a plane of rotation. The opposite end of the pin engages and rotates a pivotable crank mounted within the pivotable frame having first and second lever arms preferably of unequal length so that the stroke of the pin is mechanically amplified and translated in a different direction, the pin engaging the first lever arm. A pivotable connecting rod connects the second lever arm of the first crank to a pivotable catch also mounted within the pivotable frame and preferably remote from the plane of rotation of the hinge. As the harvester hinge mechanism closes and the pin is engaged, the catch is extended through a slot in a fixed frame member. Simultaneously, the catch begins to rotate to overlap a latching surface on the rear side of the fixed frame member. When the hinge is fully closed, the catch is fully engaged with the fixed frame.

The action of the latch is such that, in closing, the lip of the latch approaches the fixed frame member from the rear side. Preferably, the lengths of the arms on the crank and the ratios of the arm lengths are chosen such that the motion of the latch lip toward or away from the fixed frame member exactly mimics and parallels the axial motion of the pin. Thus the latch holds the hinged elements firmly together so long as the pin is fully depressed by the action of the hinge actuator, and disengages from the rear side of the fixed frame member in exact concert with disengagement of the pivotable portion from the fixed portion of the foldable corn head.

A coil spring connecting the second crank to the pivotable frame is extended by the rotation of the catch during closing of the hinge and is thereby biased to assist in opening the latch.

The foregoing and other objects, features, and advantages of the invention, as well as presently preferred embodiments thereof, will become more apparent from a reading of the following description in connection with the accompanying drawing in which.

Figure 1:
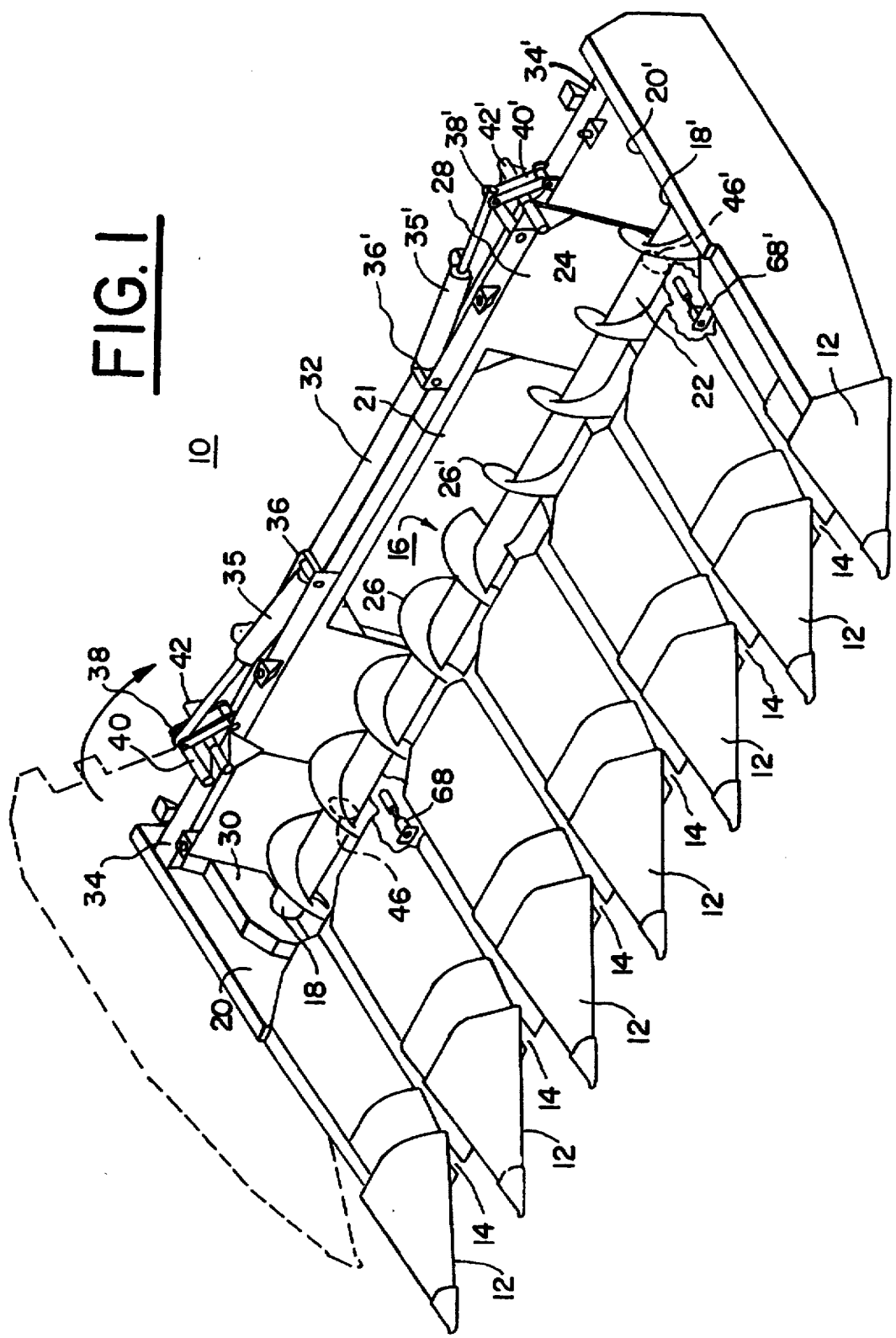
FIG. 1 is a perspective view of a foldable corn head in accordance with the invention.
Figure 2:
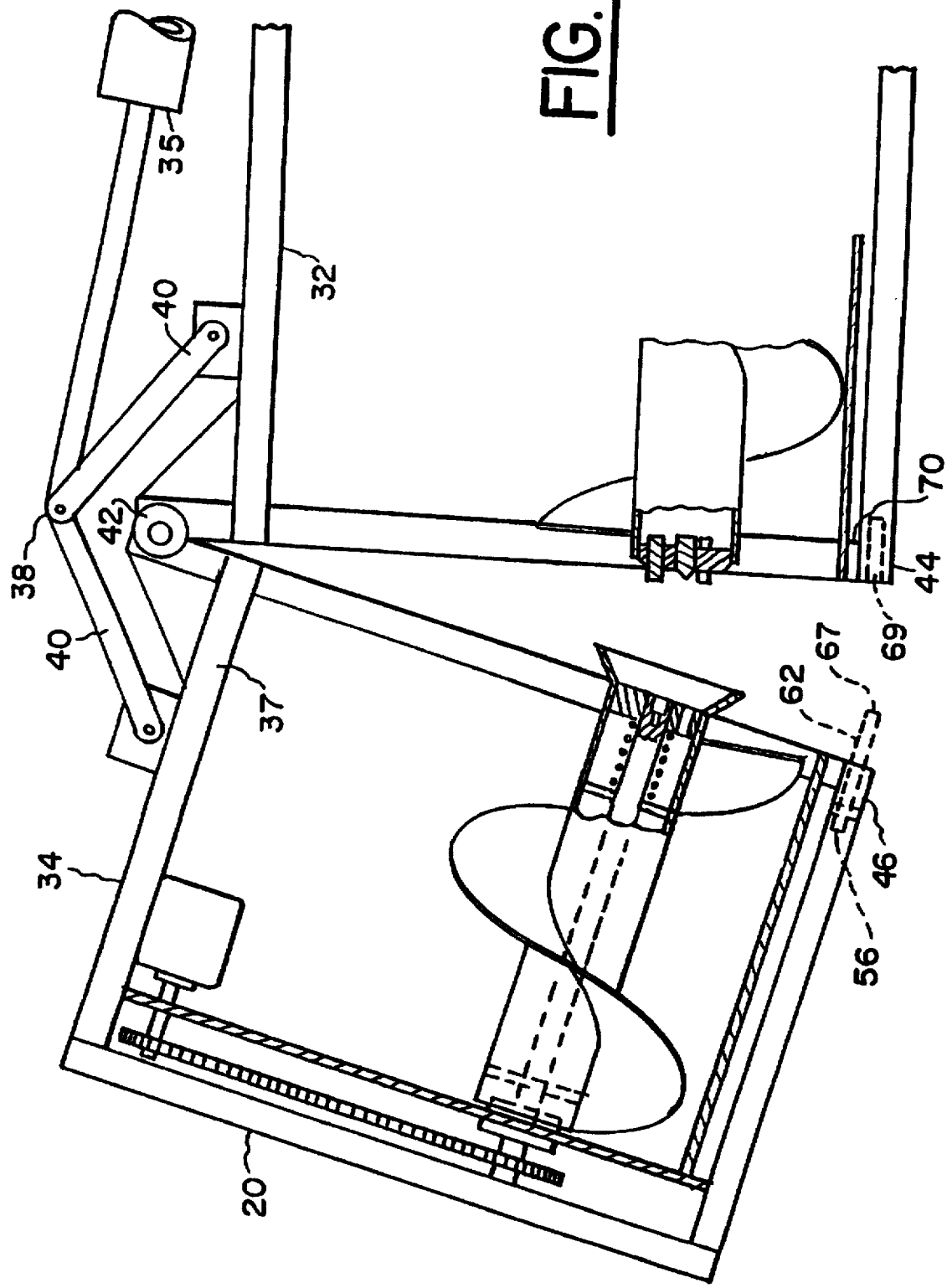
FIG. 2 is a frontal elevational view, partially in cross-section, showing a foldable end of the corn head of FIG. 1 nearing reconnection of the foldable portion into harvesting position, showing a self-actuating latch mechanism in accordance with the invention in preparatory position to latch the foldable portion to the fixed portion.

Referring to FIGS. 1 and 2, a foldable corn head 10 has seven row separators 12 defining six substantially identical row harvesting mechanisms 14. The six row harvesters shown are arbitrary in number. Other pluralities of mechanisms are possible, for example, four, eight, and ten, limited only by the increasing size, weight, and complexity of the apparatus. The row harvesting mechanisms contain common mechanical elements well known in the art, but not shown here, necessary to cut a corn stalk from its base, feed the stalk through the machine, strip or cut corn ears from the stalk, convey the individual ears rearward, and discard the spent stalk material.

At the rear of the row harvesters and disposed transversely thereof is an auger conveyor 16 rotationally mounted at its ends 18 and 18' on end plates 20 and 20' to collect ears of corn from the plurality of row harvesters 14 and deliver them to an exit 21 at the rear of the corn head. Other types of conveyors may also be suitable. Auger 22 includes a longitudinally central tube 24 supporting left-hand and right-hand progressing flights of helical flanges 26 and 26' to the left and right sides, respectively of the centerline of the corn head. A cylindrical trough 28 extends beneath and parallel to, but spaced apart from, auger 22. Trough 28 is closed at its ends by end plates 20 and 20'. Auger 22 is rotationally driven by driving means (not shown) disposed in drive case 30. Behind auger 22 and trough 28 is a fixed frame 32 for supporting the auger drive mechanism and the trough, and for facilitating mounting the corn head on a self-propelled vehicle such as a tractor (not shown). Alternatively, the trough and end plates may be fabricated as the principal structural members of the corn head, and a separate frame may not be required.

Corn head 10 is foldable to a narrower configuration to facilitate being transported over the road while mounted on a tractor without requiring disassembly. One end, and preferably both ends, may be foldable. Outer frame portions 34 and 34' of fixed frame 32 each support an outer row separator and one half of a row harvester at opposite transverse ends of the corn head. Actuation means in the form of, for example, hydraulic cylinders 35 and 35' are pivotably attached at inner ends 36 and 36' thereof to fixed frame 32, and at outer ends 38 and 38' thereof to bridging linkages 40 and 40' over hinges 42 and 42' having pivot axes substantially horizontal. Contraction of cylinders 35 and 35' pivots the pivotable outer frames on the hinges, preferably through an angle of at least 180° in a plane of rotation 43 to an inverted non-harvesting position for road travel in which the pivotable outer harvesting mechanisms on the pivotable frames are inverted above the non-pivotable harvesting mechanisms mounted on fixed frame 32 or trough 28. Extension of cylinders 35 and 35' reverses the action of contraction and reforms the corn head in harvesting position.

Folding of the corn head requires hinged separation and subsequent re-mating of the lower members 44 and 46 of the fixed frame 32 and pivotable frame 34, respectively. The principal force holding the pivotable frame in operating position during harvesting comes from cylinder 35 operating through bridging linkage 40. This force is exerted at the top 37 of the pivotable frame, and thus there is mechanical disadvantage in this being the sole force keeping lower members 44 and 46 matably engaged during operation of the harvester. In addition, the force is exerted only in plane 43 containing cylinder 35 and hinge 42. Torsional forces about an axis 45 orthogonal to the rotational axis of hinge 42, as can be generated during operation of the harvester in a field, are not well resisted by the closing force in plane 43 and can bend the frames and damage the harvester.

Figure 3:
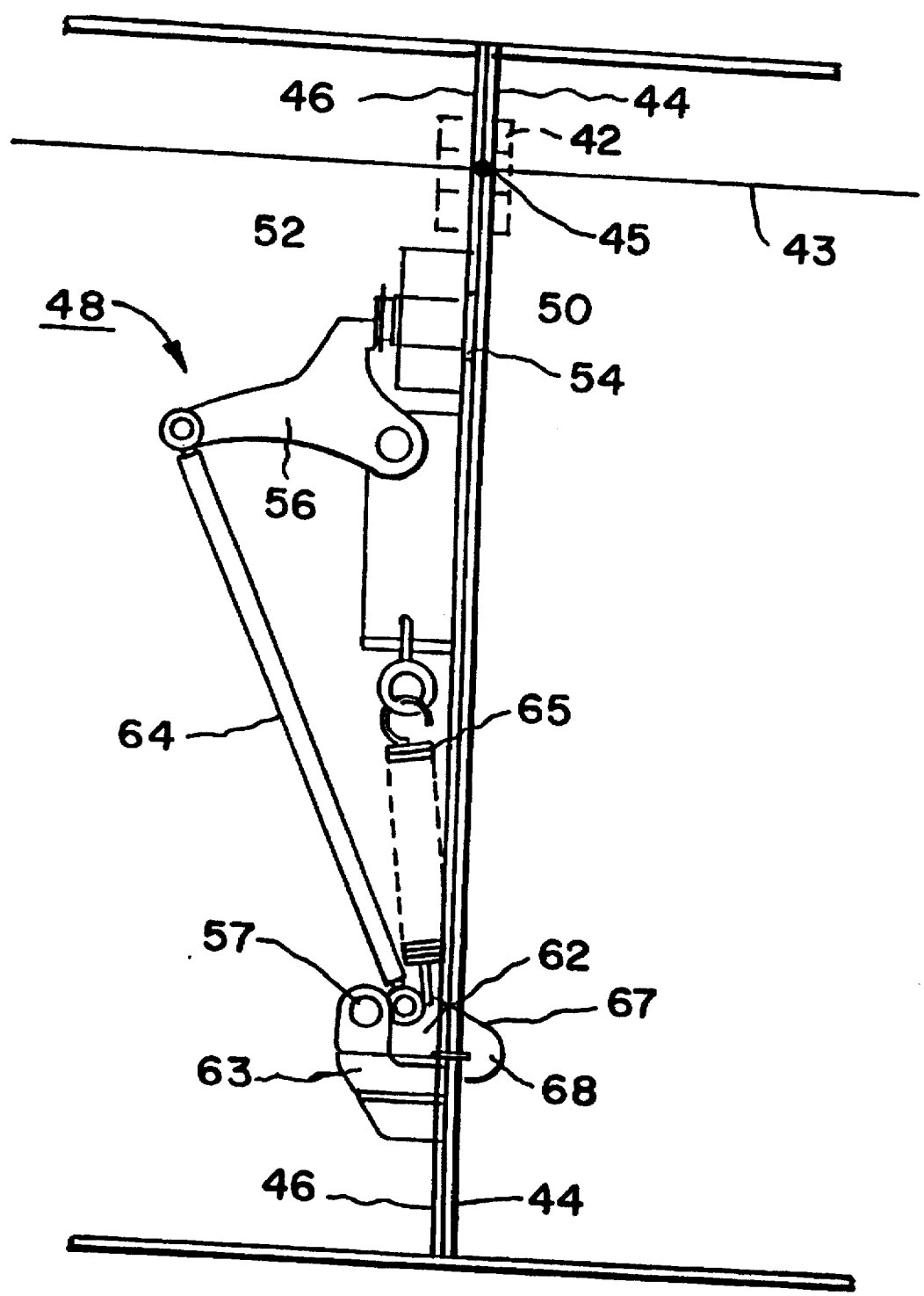
FIG. 3 is a plan view from below, showing the foldable portion latched to the fixed portion.
Figure 4:
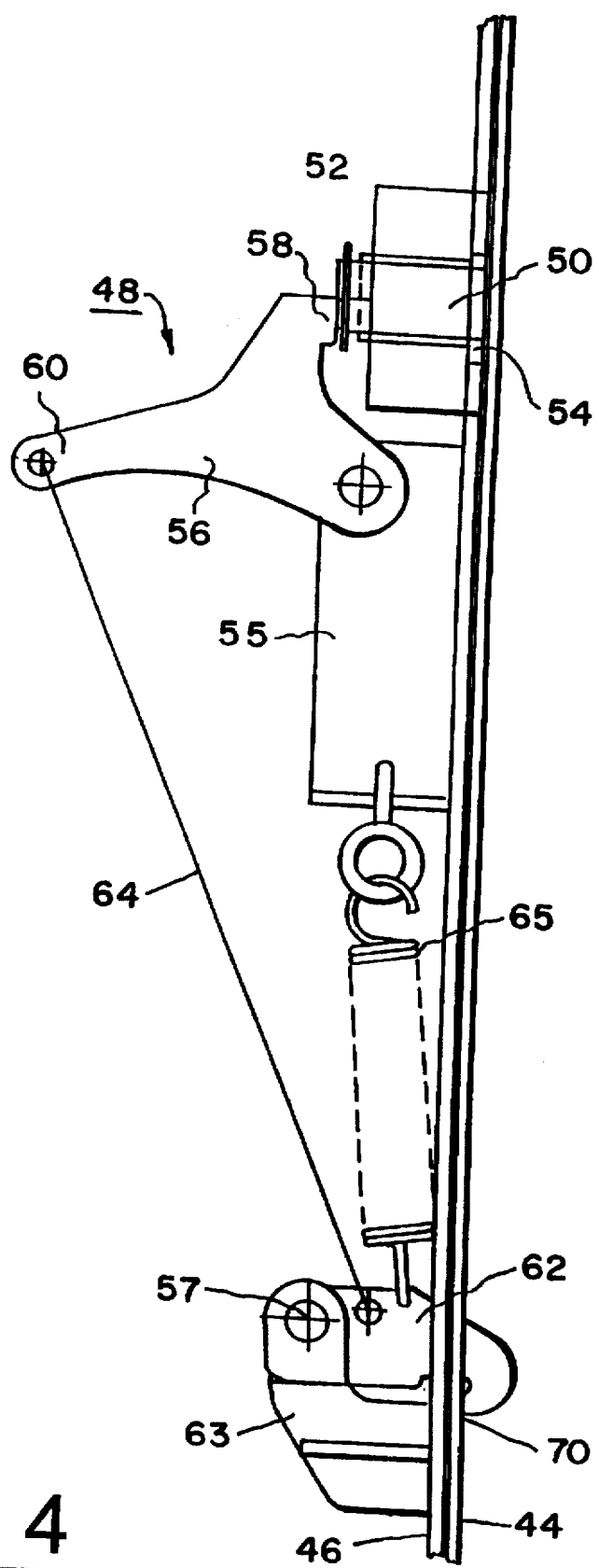
FIGS. 4 and 5 are plan views from below like FIG. 3, showing progressive delatching of the foldable portion from the fixed portion.
Figure 5:
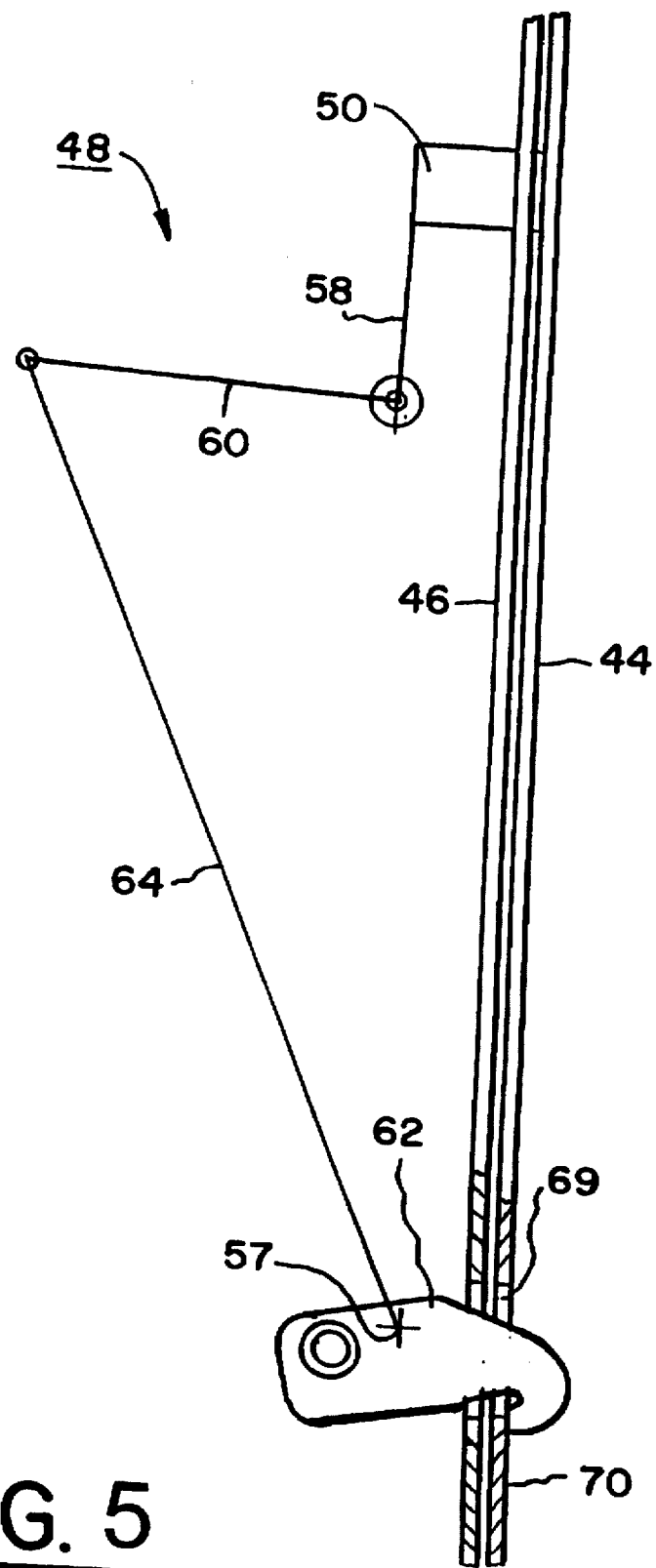
Figure 6:
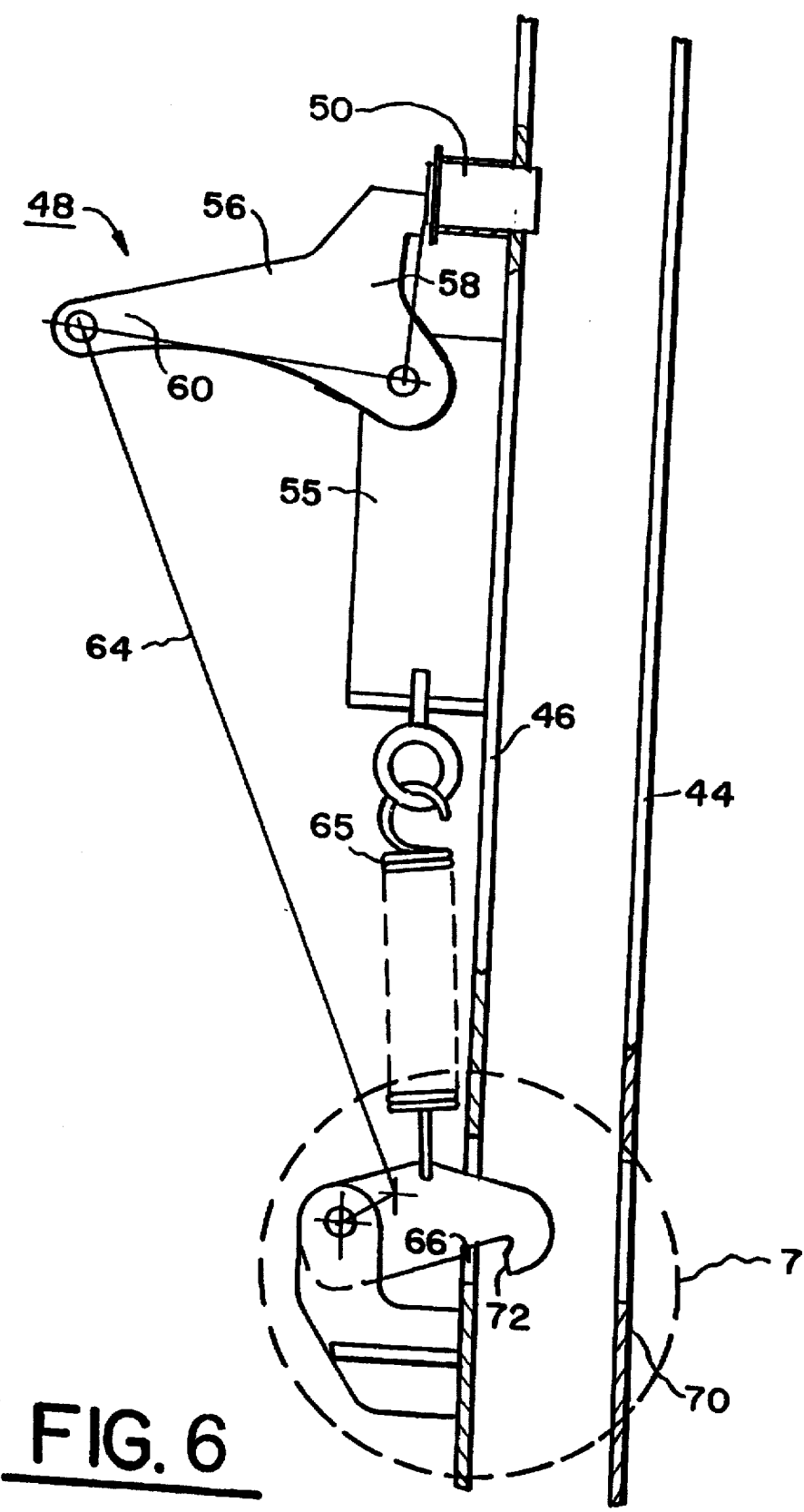
FIG. 6 is a plan view from below like FIGS. 3–5, showing the self-actuating latch completely delatched and the foldable portion separated from the fixed portion.

A preferred embodiment of a latch 48 for keeping members 44 and 46 matably engaged is shown in FIGS. 3 through 7, wherein FIGS. 3–6 show a progressive series between fully latched (FIG. 3) and fully unlatched (FIG. 6). In this embodiment, the elements of the latch are shown disposed within the pivotable outer frame 34, although the latch could alternatively be disposed within fixed frame 32 with equal operability. For simplicity and clarity of presentation, some elements realistically drawn in FIG. 3 are shown only schematically in FIGS. 4 through 7.

Figure 7:
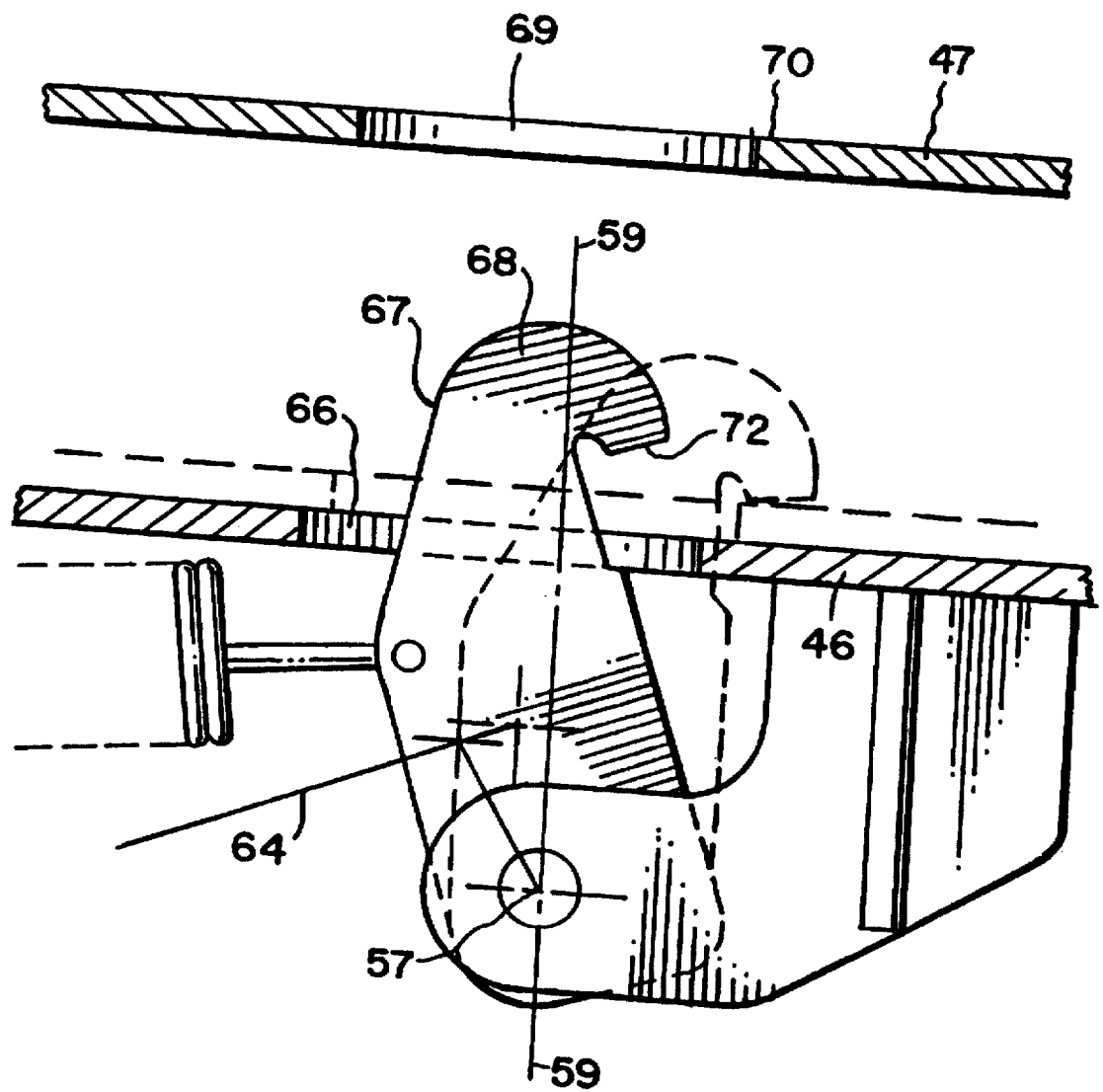
FIG. 7 is an enlarged plan view of the area within circle 7 in FIG. 6.

A pin 50 is slidably retained in pin mount 52 and is disposed for operation through a first aperture 54 in lower pivotable frame member 46. Pin 50 may be near or included in hinge rotation plane 43. When pivotable frame 34 is pivoted away from fixed frame 32, pin 50 extends beyond member 46, as shown in FIG. 6. A crank 56 is pivotably disposed on crank mount 55 attached to frame member 46. Crank 56 has first and second lever arms 58 and 60, respectively. Pin 50 engages first lever arm 58. A catch 62 is pivotably disposed on catch mount 63 which is attached to frame 46, the catch being rotatable about an axis 57. Catch 62 extends beyond frame member 46, preferably at a distance from plane 43, through a second aperture 66 in member 46 and has a shaft 67 which terminates in a hook 68. Catch 62 is preferably an "overcenter" catch, as shown in detail in FIG. 7, wherein hook 68 is disposed beyond top-dead center in the closing rotational direction of the catch, top-dead center being defined as the angular direction 59 on catch 62 from catch axis 57 orthogonal to latching surface 70 of lower fixed frame member 44. Catch 62 is shown in FIG. 7 in both the open (solid lines) and closed (phantom) positions. The overcenter nature of the catch allows the catch to engage the lower fixed member from the rear and urge it toward the lower pivotable member even though the catch be pivoted from the opposite side of the lower fixed member. Connecting link 64 is pivotably connected to second arm 60 and catch 62, such that rotation of crank 56 causes opposite sense rotation of catch 62. Coil spring 65 biases the latch in the open position. Lower member 44 of fixed frame 32 is provided with a slot 69 which can matably accept shaft 67 and hook 68 therethrough and has a latching surface 70 on an inner surface thereof.

Other embodiments of actuating linkage are possible. For example, a pivoting lever can be used to actuate catch 62 in place of the pin, crank, and connecting link described above.

In operation, as the pivotable portion 34 of the corn head is pivoted by cylinder 35 into operating position, shaft 67 and hook 68 are extended through slot 69. Fixed frame member 44 engages pin 50. Further pivoting of member 46 engages and displaces pin 50 axially, causing crank 56 to rotate counterclockwise, which in turn causes catch 62 to rotate clockwise, causing lip 72 of hook 68 to engage latching surface 70. Preferably, the lengths of all lever arms and links, as well as the angles therebetween, and the length of shaft 67 are selected in accordance with known mechanical principles such that the motion of lip 72 and member 44 toward member 46 mimics the axial motion of pin 50. Thus, when members 44 and 46 are fully mated, pin 50 is fully depressed and catch 62 is fully engaged with surface 70, firmly latching pivotable frame 34 to fixed frame 32 as shown in FIG. 3

Opening the latch is the reverse of closing. As the closing force of cylinder 35 is reversed to an opening force, the catch is withdrawn from engagement with lower fixed member 44 in synchrony with axial movement of the pin 50 as urged by spring 65.

In the embodiment shown in FIGS. 3–6, the catch 62 is a secondary lever wherein the point of attachment of link 64 lies between pivot axis 57 and lip 72, causing catch 62 to rotate clockwise to latch. In another embodiment (not shown), catch 62 is a primary lever wherein the pivot axis lies between the point of attachment and the lip, and the catch is caused to rotate counter-clockwise to latch. Of course, in the latter embodiment, the hook and latching surface are reversed and are located to the left of top-dead center, rather than to the right as in the first embodiment.

From the foregoing description it will be apparent that there has been provided an improved self-actuated latch for a foldable corn head, wherein the latch is actuated to close or to open by the folding action of the corn head itself. Variations and modifications of the herein described latch, in accordance with the invention, will undoubtedly suggest themselves to those skilled in this art. Accordingly, the foregoing description should be taken as illustrative and not in a limiting sense.

What is claimed is:

1. In a corn head having a fixed frame and a pivotable frame foldable and unfoldable between a harvesting configuration and a non-harvesting configuration, a latch for securing the pivotable frame to the fixed frame, said latch being disposed on one of said pivotable and fixed frames, said latch comprising:

a) an actuator disposed on one of said frames and responsive to contact with the other of said frames; and b) an overcenter catch connected to and rotatable by said actuator in a first direction to engage a latching surface on the other of said frames and in a second and opposite direction to disengage said catch from said latching surface, said engaging and disengaging being solely from said responsive contact of said actuator with the other of said frames.

2. In a corn head having a fixed frame and a pivotable frame foldable and unfoldable between a harvesting configuration and a non-harvesting configuration, a latch for securing the pivotable frame to the fixed frame, said latch being disposed on one of said pivotable and fixed frames, said latch comprising:

a) an actuator disposed on one of said frames and responsive to contact with the other of said frames; and b) an overcenter catch connected to and rotatable by said actuator in a first direction to engage a latching surface on the other of said frames, said actuator including a pin slidably mounted on one of said frames to project a portion of said pin beyond an edge of said frame when said corn head is in said non-harvesting configuration, said pin being disposed in interfering relationship with and being displaceable by said other frame when said pivotable frame is pivoted from said non-harvesting position to said harvesting position, a crank rotatably mounted on one of said frames, said crank having first and second lever arms, said first arm being actuable by contact with said pin in contact with said other frame, and a connecting link pivotably connected at one end thereof to said second lever arm and at the other end thereof to said catch, said link being displaceable by rotation of said crank to cause a lip of said overcenter catch to latchably engage said latching surface in response to displacement of said pin.

3. A latch in accordance with claim 1 wherein said overcenter catch is mounted to project a hook portion of said catch beyond a latching surface of the other of said frames when said pivotable frame is pivoted from said non-harvesting position to said harvesting position.

4. A latch in accordance with claim 2 wherein said crank is rotatable in a second direction opposite to said first direction to cause said overcenter catch to disengage from said latching surface.

5. A latch in accordance with claim 1 further comprising a spring connected to said catch to bias said latch toward a non-latching position.

6. A latch in accordance with claim 2 wherein said two lever arms of unequal length.

7. A latch in accordance with claim 2 wherein the lengths of said lever arms, the included angle therebetween, the length of said connecting link, and the length of said catch are selected such that the motion of said lip of said catch in the direction of said frames mimics the motion of said pin in said direction.

* * * * *